United States Patent
Li et al.

(10) Patent No.: US 10,432,520 B2
(45) Date of Patent: Oct. 1, 2019

(54) TRAFFIC FORWARDING BETWEEN GEOGRAPHICALLY DISPERSED SITES

(71) Applicant: NICIRA, INC., Palo Alto, CA (US)

(72) Inventors: Qin Li, Beijing (CN); Shailesh Urhekar, Pune (IN); Amit Chopra, Pune (IN); Ayyappan Veeraiyan, Palo Alto, CA (US); Uday Masurekar, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 407 days.

(21) Appl. No.: 15/011,689

(22) Filed: Feb. 1, 2016

(65) Prior Publication Data

US 2017/0063683 A1   Mar. 2, 2017

(30) Foreign Application Priority Data

Aug. 28, 2015 (IN) .......................... 4554/CHE/2015

(51) Int. Cl.
*H04L 12/741* (2013.01)
*H04L 12/46* (2006.01)

(52) U.S. Cl.
CPC .......... *H04L 45/74* (2013.01); *H04L 12/4641* (2013.01)

(58) Field of Classification Search
None
See application file for complete search history.

(56) References Cited

U.S. PATENT DOCUMENTS

| 7,672,314 | B2 | 3/2010 | Elangovan |
| 7,693,158 | B1 | 4/2010 | Carrie |
| 8,379,656 | B2 | 2/2013 | Waldrop et al. |
| 2003/0152075 | A1 | 8/2003 | Hawthorne, III et al. |
| 2014/0112349 | A1* | 4/2014 | Moreno ................. H04L 45/64 370/400 |
| 2014/0208317 | A1* | 7/2014 | Nakagawa .......... G06F 9/45533 718/1 |
| 2015/0016300 | A1* | 1/2015 | Devireddy .......... H04L 41/0893 370/254 |
| 2015/0063353 | A1* | 3/2015 | Kapadia ................ H04L 45/745 370/392 |
| 2016/0036774 | A1* | 2/2016 | Chong .................... H04L 45/02 370/392 |
| 2016/0211989 | A1* | 7/2016 | Jain ..................... H04L 12/4633 |
| 2016/0352632 | A1* | 12/2016 | Nedeltchev ........... H04L 45/502 |
| 2016/0366046 | A1* | 12/2016 | Anantharam ......... H04L 45/026 |

* cited by examiner

*Primary Examiner* — Jason E Mattis
*Assistant Examiner* — Hong Shao
(74) *Attorney, Agent, or Firm* — Su IP Consulting

(57) ABSTRACT

Example methods are provided to perform traffic forwarding between geographically dispersed first site and second site and to support traffic forwarding via a trunk interface. In one example, the method may comprise receiving, by a first edge device at the first site, network traffic comprising a plurality of packets via a trunk interface of the first edge device from a virtual tunnel endpoint, the virtual tunnel endpoint having decapsulated the packets prior to communicating the packets through the trunk interface. The method may further comprise reading an overlay network identifier from each of the packets to identify a source overlay network of the received network traffic from the multiple overlay networks; modifying each of the packets to include a virtual local area network (VLAN) identifier; and forwarding modified network traffic to a second edge device at the second site to identify the destination network based on the VLAN identifier.

15 Claims, 9 Drawing Sheets

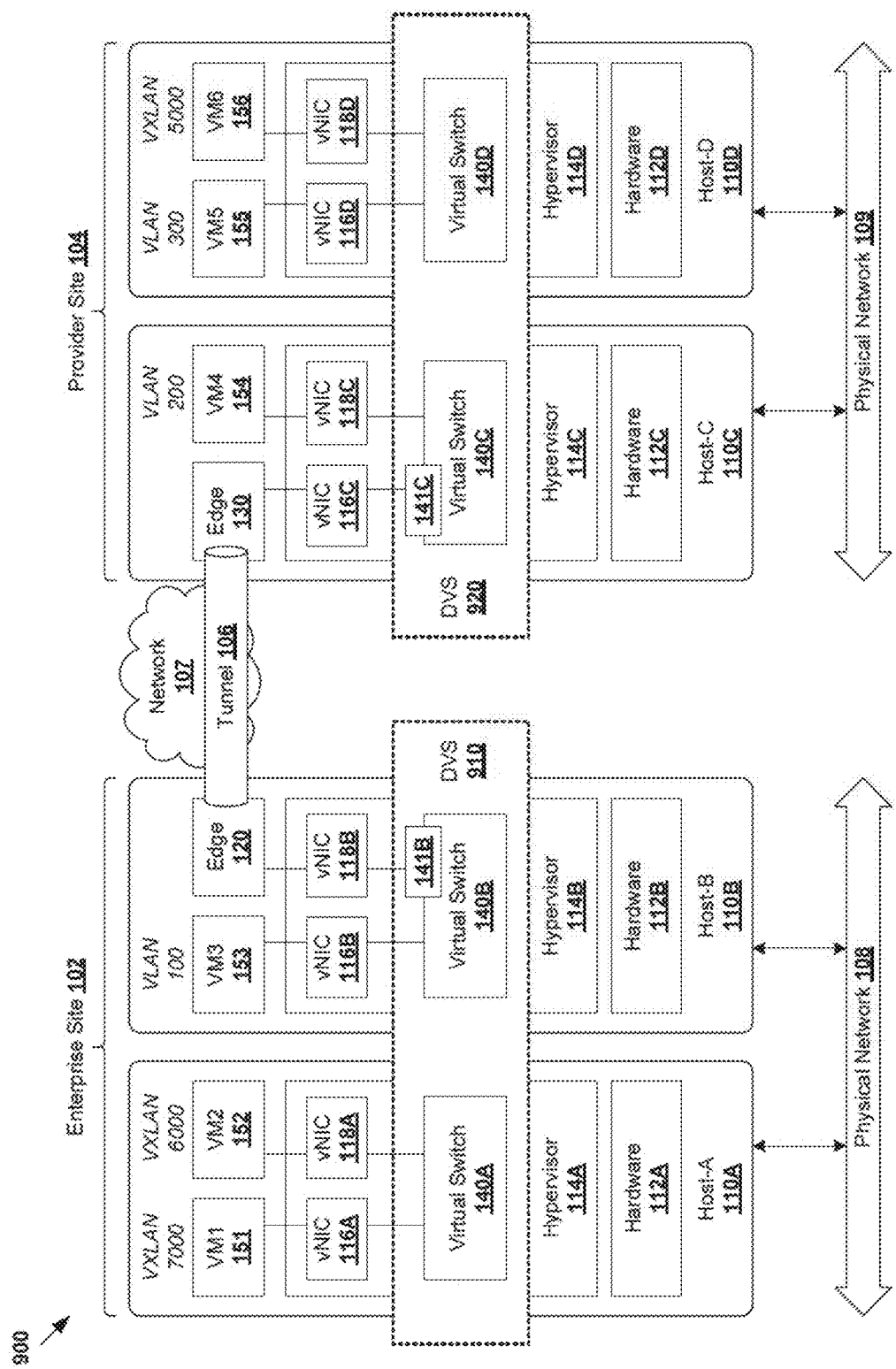

TRAFFIC FORWARDING BETWEEN GEOGRAPHICALLY DISPERSED SITES

RELATED APPLICATIONS

Benefit is claimed under 35 U.S.C. 119(a)-(d) to Foreign application Serial No. 4554/CHE/2015 filed in India entitled "TRAFFIC FORWARDING BETWEEN GEOGRAPHICALLY DISPERSED SITES", on Aug. 28, 2015, by Nicira, Inc., which is herein incorporated in its entirety by reference for all purposes.

BACKGROUND

Unless otherwise indicated herein, the approaches described in this section are not admitted to be prior art by inclusion in this section.

The virtualization of computing resources provides opportunities for cloud service providers to sell virtual resources such as compute and storage resources to enterprises. For example, by purchasing additional virtual resources from a cloud service provider, an enterprise may run some workloads (e.g., virtual machines, etc.) at an enterprise site while other workloads are migrated to the provider site that is usually geographically dispersed from the enterprise site. In various forms, this general model of computing (known as "cloud computing") helps to reduce the costs of building, running and maintaining physical computing systems at the enterprise site. In a network environment with geographically dispersed sites, it is desirable for workloads at both the enterprise site and the provider site to communicate with each other as seamlessly as possible.

BRIEF DESCRIPTION OF DRAWINGS

FIG. 9 is a schematic diagram of another example of the network environment in FIG. 1 to provide layer-2 connectivity.

DETAILED DESCRIPTION

Figure 1:
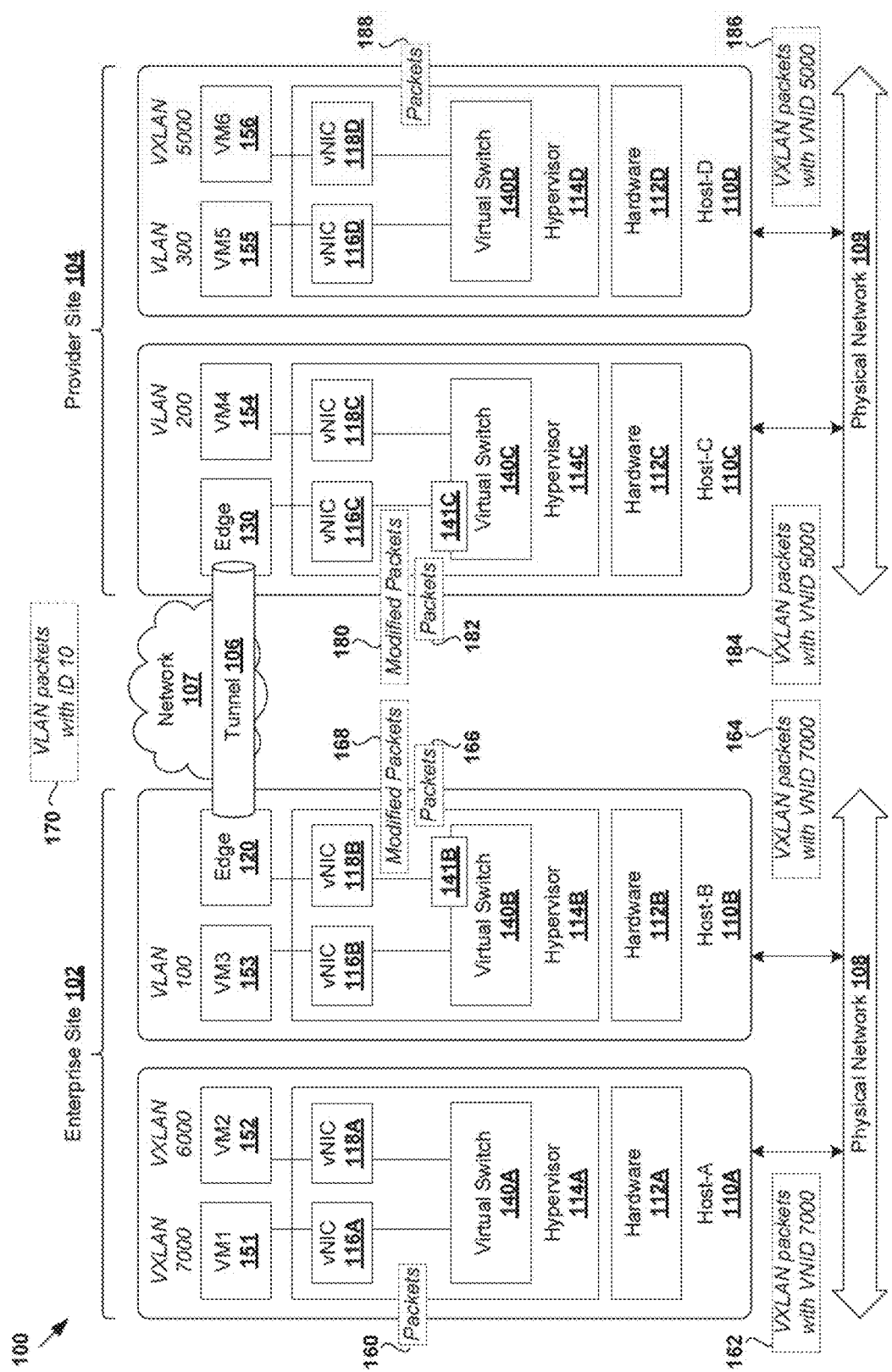
FIG. 1 is a schematic diagram illustrating an example network environment with geographically dispersed sites according to a first traffic forwarding scenario.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of traffic forwarding between geographically dispersed sites will be described in more detail using FIG. 1, which is a schematic diagram of example network environment 100 with geographically dispersed sites 102, 104 according to a first traffic forwarding scenario. It should be understood that example network environment 100 may include additional and/or alternative components than that shown, depending on the desired implementation. For example, although four hosts are shown for simplicity, any number of hosts may be used, each host supporting any suitable number of virtual machines. Also, although virtual machines are shown, example network environment 100 may further include physical clients.

Network environment 100 includes various hosts (also known as "computing devices", "host computers", "host devices", "physical servers", "server systems", etc.) deployed at enterprise site 102 and provider site 104. For example, Host-A 110A and Host-B 110B are located at enterprise site 102, and Host-C 110C and Host-D 110D at provider site 104. In the following, reference numerals with a suffix "A" relates to elements of Host-A 11.0A, suffix "B" relates to Host-B 110B, suffix "C" relates to Host-C 110C and suffix "D" relates to Host-D 110D.

Enterprise edge 120 (also known as "enterprise edge device", "customer edge device") is located at the edge of enterprise site 102 to forward ingress network traffic to, and network traffic from, enterprise site 102. Provider edge 130 (also known as "provider edge device") is located at the edge of provider site 104 to forward ingress network traffic to, and egress traffic from, provider site 104. As used herein, the term "network traffic" may refer generally to a group of bits that can be transported together from a source to a destination, such as in the form of "packets", "frames", "messages", "datagrams", etc.

The term "egress network traffic" may refer generally to network traffic that flows from a source within a site to a destination outside of the site. The term "ingress network traffic" generally refers to network traffic that flows from a source outside of the site to a destination within the site. As used herein, the term "layer-2" generally refers to a Media Access Control (MAC) layer, "layer-3" to a network layer, and "layer-4" to a transport layer in the Open System Interconnection (OSI) model, although the concepts described herein may be applicable to other layer(s) and/or other networking model(s)

Enterprise edge 120 and provider edge 130 may be network elements implemented using one or more virtual or physical machines capable of performing functionalities of switches, routers, bridges, any combination thereof, etc. In the example in FIG. 1, enterprise edge 120 and provider edge 130 are implemented using virtual machines supported by Host-B 110B and Host-C 110C, respectively. To support various virtual machines, each host 110A/110B/110C/110D includes suitable hardware 112A/112B/112C/112D and virtualization software such as hypervisor 114A/114B/114C/114D.

Virtual machines 151-158 are deployed to execute any suitable services and applications. Hypervisor 114A/114B/114C/114D maintains a mapping between hardware 112A/112B/112C/112D and virtual resources allocated to the virtual machines supported by of host 110A/110B/110C/110D. For example, hardware 112A/112B/112C/112D may include components such as physical network interface controller (NIC) to provide access to physical network 108/109; Central Processing Unit (CPU), memory (e.g., random access memory), storage controller and storage disk (e.g., solid state drive, hard disk drive), etc.

Each virtual machine is allocated with virtual resources, such as virtual CPU, virtual memory, virtual disk, virtual NIC (vNIC), etc. In the example in FIG. 1, vNIC 116A is configured for VM1 151, vNIC 118A for VM2 152, vNIC 116B for VM3 153 and vNIC 118B for enterprise edge 120. At provider site 104, vNIC 116C is configured for provider edge 130, vNIC 118C for VM4 154, vNIC 116D for VM5 155 and vNIC 118D for VM6 156. Although not shown for simplicity, a virtual machine monitor (VMM) may be used to emulate the resources each virtual machine. To facilitate traffic forwarding, hypervisor 114A/114B/114C/114D implements virtual switch 140A/140B/140C/140D. For example, virtual switch 140A on Host-A 110A facilitates ingress and egress traffic forwarding for VM1 151 and VM2 152; virtual switch 140B for enterprise edge 120 and VM3 153; virtual switch 140C for provider edge 130 and VM4 154; and virtual switch 140D for VM5 155 and VM6 156.

Although examples of the present disclosure refer to "virtual machines", it should be understood that virtual machines running within a virtualization environment are merely one example of "workloads". In general, a workload may represent an addressable data compute node or isolated user space instance. In practice, any suitable technologies aside from hardware virtualization may be used to provide isolated user space instances. For example, other workloads may include physical hosts, client computers, containers (e.g., running on top of a host operating system without the need for a hypervisor or separate operating system), virtual private servers, etc. The virtual machines may also be complete computation environments, containing virtual equivalents of the hardware and system software components of a physical computing system.

To provide connectivity between enterprise edge 120 and provider edge 130, tunnel 106 (e.g., secure socket layer (SSL) tunnel, etc.) may be implemented over any suitable layer-3 network 107. Here, the term "tunnel" is used generally to describe an end-to-end, bi-directional communication path between enterprise edge 120 and provider edge 130. In a Layer-2 Virtual Private Network (L2VPN) implementation, enterprise edge 120 may represent an L2VPN client, and provider edge 130 L2VPN server. Any suitable protocol may be used by network 107, such as Internet Protocol (IP), Multi-Protocol Label Switching (MPLS), etc.

Virtual machines 151-156 may be deployed on the same or different logical networks in the form of layer-2 segments. For example, Virtual Local Area Networks (VLANs) according to the Institute of Electrical and Electronics Engineers (IEEE) 802.1Q standard has been traditionally used to create isolated broadcast domains. In the example in FIG. 1 (three VLANs are shown for simplicity), VM3 153 is deployed on VLAN 100, VM4 154 on VLAN 200 and VM5 155 on VLAN 300. Each VLAN is identified by a 12-bit VLAN identifier (ID). This limits the number of VLANs that can coexist within the same administrative domain to 4094 (0 and 4095 are reserved), which is often inadequate for large data centres.

Overlay networks (also known as "logical overlay networks") such as Virtual eXtensible Local Area Network (VXLAN) are used to address the scalability limitation of VLANs. VXLAN is a tunneling protocol that overlays layer-2 logical networks over layer-3 physical networks. In this case, each overlay network is known as a "VXLAN segment" that is identified using a 24-bit VXLAN network identifier (VNID), allowing over 16 million VXLAN segments to coexist within the same administrative domain. In the example FIG. 1 (three VXLAN segments are shown for simplicity), VM1 151 is deployed on VXLAN 7000, VM2 152 is on VXLAN 6000 and VM6 156 on VXLAN 5000.

Layer-2 Network Extension

In network environment 100, it is desirable to "extend" or "stretch" layer-2 segments across enterprise site 102 and provider site 104 to facilitate communication among virtual machines 151-156 located at different sites 102, 104. The layer-2 segments to be stretched may be VLAN or VXLAN segments, and have the same or different VLAN IDs or VNIDs. For example in FIG. 1, VXLAN-VXLAN extension is required to support a first traffic forwarding between VM1 151 on VXLAN 7000 and VM6 156 on VXLAN 5000. In another example in FIG. 5, VXLAN-VLAN extension is required to support traffic forwarding between VM2 152 on VXLAN 6000 and VM5 155 on VLAN 300. Further, VLAN-VLAN extension is to support traffic forwarding between VM3 153 on VLAN 100 to VM4 on VLAN 200.

Referring to the first traffic forwarding scenario in FIG. 1, virtual switch 140A serves as a VXLAN tunnel endpoint (VTEP) for VM1 151 to perform VXLAN encapsulation on packets (see 160 labelled "Packets" in FIG. 1) transmitted by VM1 151. This results in encapsulated VXLAN packets (see 162 labelled "VXLAN packets with VNID 7000" in FIG. 1) each having a VXLAN header carrying a VNID identifying the source overlay network. In order to reach destination VXLAN 5000, virtual switch 140A on Host-A 110A sends encapsulated packets 162 to enterprise edge 120, i.e., the default gateway of VM1 151.

Conventionally, some implementations of enterprise edge 120 and/or provider edge 130 are unable to support VXLAN-VXLAN and VXLAN-VLAN extensions. For example, this may occur when enterprise edge 120 or provider edge 130 are configured to forward VLAN packets (e.g., using a Linux kernel), but not encapsulated VXLAN packets. Further, in the first traffic forwarding scenario in FIG. 1, virtual switch 140B serves as a VTEP to perform VXLAN decapsulation on packets (see 164 labelled "VXLAN packets with VNID 7000" in FIG. 1) received from virtual switch 140A. The resulting decapsulated packets (see 166 labelled "Packets" in FIG. 1) do not include any VXLAN header from which the source overlay network can be identified.

According to examples of the present disclosure, enterprise edge 120 and provider edge 130 are configured to support VXLAN-VXLAN and VXLAN-VLAN extensions. In particular, before packets decapsulated by virtual switch 140B (see 166 labelled as "Packets" in FIG. 1) are communicated to enterprise edge 120, the packets are modified to include an overlay network identifier (e.g., VNID=7000 for VXLAN 7000). The modification results in modified packets (see 168 in FIG. 1), which allows enterprise edge 120 to identify the source overlay network (e.g., VXLAN 7000) from the overlay network identifier.

According to examples of the present disclosure, a VLAN ID (e.g., tag 10) is used to associate the source overlay network (e.g., VXLAN 7000) at enterprise site 102 to a destination network (e.g., VXLAN 5000) at provider site 104. Packets (see 170 in FIG. 1) forwarded by enterprise edge 120 include the VLAN ID for provider edge 130 to identify the associated destination network (e.g., VXLAN 5000). The use of the VLAN ID, instead of VNID, in the packets facilitates compatibility with components of enterprise edge 120 and provider edge 130 that are unable to handle encapsulated VXLAN packets. This avoids changes to those components, which may be very complicated, expensive or impractical in practice.

Further, according to examples of the present disclosure, vNIC 118B is configured as a trunk interface of enterprise edge 120. Here, the term "trunk interface" may generally refer to an interface configured to receive packets from multiple layer-2 segments or logical networks. In practice, trunk interface 118B of enterprise edge 120 is connected to trunk port 1418 of virtual switch 140B. In one example, trunk interface 118B may be configured to handle packets to and from multiple VXLAN segments (e.g., VXLAN 7000 and VXLAN 5000 in FIG. 1). In another example, trunk interface 118B may be configured to handle packets to and from multiple VXLAN segments as well as VLAN segments. Similarly, vNIC 116C may be configured as a trunk interface of provider edge 130, and connected to trunk port 141C of virtual switch 140C. As will be described below, trunk interface 118B/116C may be used to facilitate multiple layer-2 network extensions across enterprise site 102 and provider site 104.

In the following, the first traffic forwarding scenario in FIG. 1 will be explained with reference to FIG. 2, FIG. 3 and FIG. 4. The second traffic forwarding scenario in FIG. 5 will be explained with reference to FIG. 2, FIG. 4 and FIG. 6. Further example implementations will be described using FIG. 7, FIG. 8 and FIG. 9. Throughout the present disclosure, enterprise edge 120 is used as an example "first edge device", provider edge 130 as an example "second edge device", enterprise site 102 as an example "first site" and provider site 104 as an example "second site".

In practice, the examples discussed herein may be adapted for any suitable network environment, and performed by any suitable devices at geographically dispersed sites. For example, although VXLAN is used as an example in FIG. 1, any other suitable overlay network technology may be used, such as Generic Network Virtualization Encapsulation (GENEVE), Network Virtualization using Generic Routing Encapsulation (NVGRE), etc.

Example VXLAN-VXLAN Extension

Figure 2:
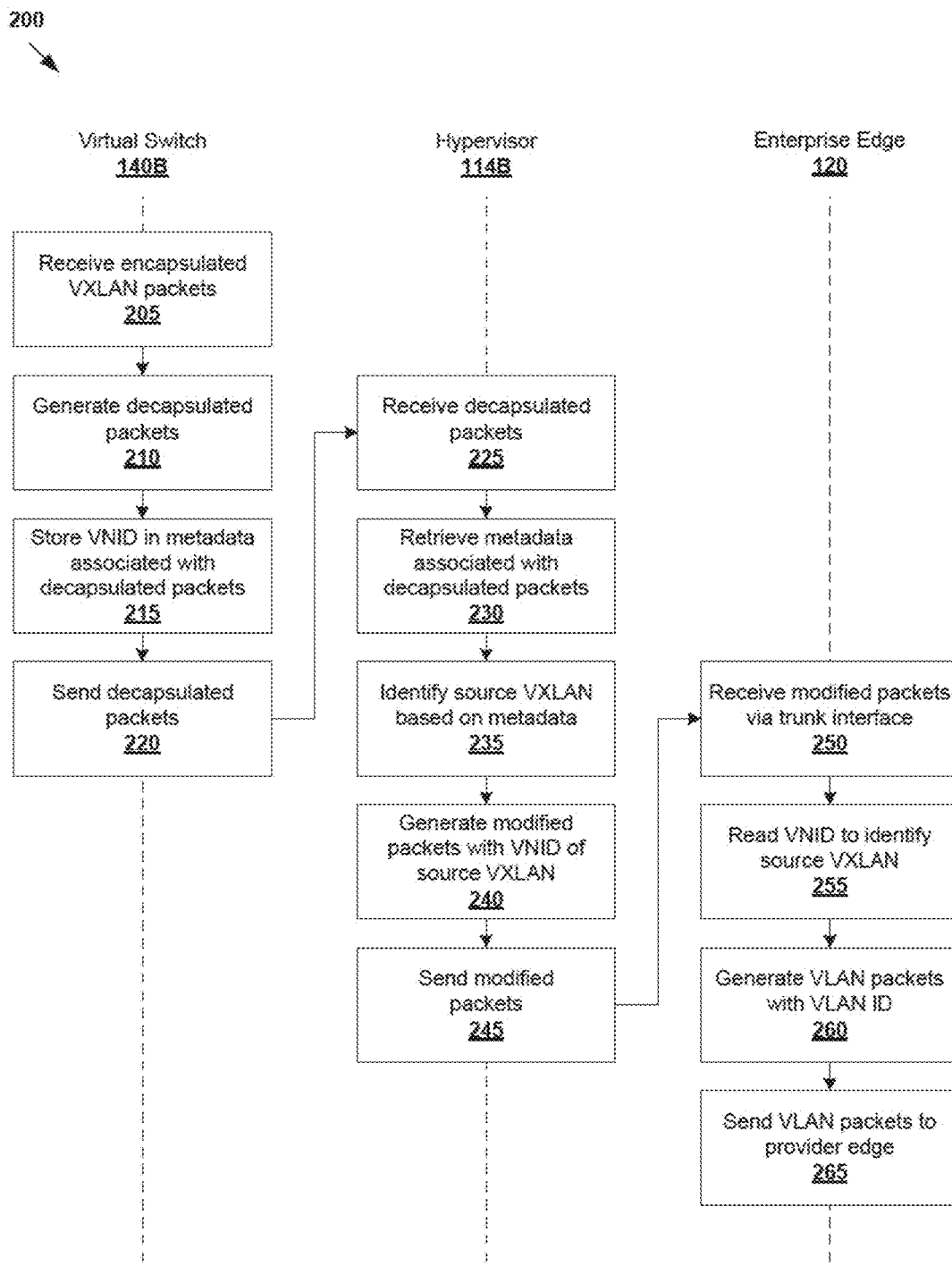
FIG. 2 is a flowchart of an example process to perform traffic forwarding from a source overlay network according to the first traffic forwarding scenario in FIG. 1.

FIG. 2 is a flowchart of example process 200 to perform traffic forwarding from a source overlay network according to the first traffic forwarding scenario in FIG. 1. In this example, VXLAN 7000 is an example "source overlay network" and VXLAN 5000 an example "destination network" or "destination overlay network". Example process 200 may include one or more operations, functions, or actions illustrated by one or more blocks, such as blocks 205 to 265. The various blocks may be combined into fewer blocks, divided into additional blocks, and/or eliminated based upon the desired implementation. For example, although virtual switch 140B is shown to perform blocks 205 to 220 and hypervisor 114B to perform blocks 225-245, these blocks and related examples throughout the present disclosure may be performed by a single module in practice.

(a) Packet Processing by Virtual Switch 140B

At 205 in FIG. 2, virtual switch 140B on Host-B 110B receives encapsulated packets 164 from Host-A 110A. Here, the term "encapsulated" refers generally to overlay network encapsulation, such as VXLAN encapsulation. For example, each encapsulated VXLAN packet 164 includes an outer Ethernet header, an outer IP header, an outer User Datagram Protocol (UDP) header and a VXLAN header carrying the VNID of the source overlay network (e.g., VNID=7000 for VXLAN 7000). This is also known as the MAC-in-UDP encapsulation.

At 210 in FIG. 2, virtual switch 140B serves as a VTEP for enterprise edge 120 to perform decapsulation to generate decapsulated packets (see 166 labelled "Packets" in FIG. 1). Here, the term "decapsulated" refers generally to overlay network decapsulation, such as VXLAN decapsulation. In the case of VXLAN, the outer Ethernet header, outer IP header, outer UDP header and VXLAN header are removed from each received encapsulated VXLAN packet 164.

At 215 in FIG. 2, virtual switch 140B stores the VNID of the source overlay network (i.e., VNID=7000 for VXLAN 7000) in metadata associated with decapsulated packets 166. For example, the metadata may be stored in any suitable storage (e.g., kernel memory) accessible by hypervisor 114B (to be discussed below). Although 215 is shown after 210 in FIG. 2, 215 may be performed before, or together with, 210 depending on the desired implementation. At 220 in FIG. 2, virtual switch 140B communicates decapsulated packets 166 through to trunk interface 118B of enterprise edge 120, which is configured as the default gateway of VM1 151.

(b) Packet Processing by Hypervisor 114B

If decapsulated packets 166 are communicated through to trunk interface 118B, enterprise edge 120 would not be able to identify their source overlay network (e.g., VXLAN 7000). This is because trunk interface 118B is configured to receive packets from multiple overlay networks (e.g., VXLAN 7000 and VXLAN 6000) but decapsulated packets 166 do not carry any VXLAN header from which the source overlay network can be identified.

To circumvent the decapsulation performed by virtual switch 140B, hypervisor 114B may be configured to modify decapsulated packets 166 to allow enterprise edge 120 to identify the source overlay network (e.g., VXLAN 7000). As a result of the modification, "modified packets" (see 168 in FIG. 1) will be communicated through to trunk interface 118B, instead of the decapsulated packets 166. An example modification will be discussed below.

In more detail, at 225 in FIG. 2, hypervisor 114B on Host-B 1108B receives decapsulated packets 166 from virtual switch 140B. Here, the term "receive" or "receiving" may also refer to hypervisor 114B intercepting or detecting decapsulated packets 166 that are intended for trunk interface 118B of enterprise edge 120.

At 230 and 235 in FIG. 2, hypervisor 114B retrieves metadata associated with decapsulated packets 166 to identify the source overlay network (e.g., VX LAN 7000). As discussed at 220, VNID=7000 of VXLAN 7000 may be stored as part of the metadata.

At 240 in FIG. 2, hypervisor 114B generates modified packets 168 by modifying decapsulated packets 166. Modified packets 168 each include an overlay network identifier (e.g., VNID=7000) corresponding to the identified source overlay network (e.g., VXLAN 7000). Any suitable format may be used for modified packets 168. As will be discussed with reference to FIG. 4 below, modified packets 168 may be generated by encapsulating each decapsulated packet 166 with a "pseudo header" that includes the overlay network identifier (e.g., VNID=7000). At 245 in FIG. 2, hypervisor 114B sends modified packets 168 through to trunk interface 118B of enterprise edge 120.

(c) Packet Processing by Enterprise Edge 120

At 250 in FIG. 2, enterprise edge 120 receives modified packets 168 via trunk interface 118B. At 255 in FIG. 2, enterprise edge 120 reads the overlay network identifier (e.g., VNID=7000) from modified packets 168 to identify the source overlay network (e.g., VXLAN 7000). At 260 in FIG. 2, enterprise edge 120 converts modified packets 168 to VLAN packets (see 170 labelled "VLAN packets with VLAN ID 10" in FIG. 1).

The conversion or modification at 260 involves modifying each packet to include a VLAN ID that associates the identified source overlay network (e.g., VXLAN 7000) with a destination overlay network (e.g., VXLAN 5000). For example in FIG. 1, VXLAN 7000 is mapped to VLAN 10 at enterprise site 102, which is then mapped to VXLAN 5000 at provider site 104. The VLAN ID is also referred to as an "internal VLAN ID" or "internal VLAN tag". Here, the term "internal" may generally refer to the VLAN ID being known to enterprise edge 120 and provider edge 130 for inter-site traffic forwarding purposes.

At 265 in FIG. 2, enterprise edge 120 forwards VLAN packets 170 to provider edge 130 via tunnel 106. As will be described below, provider edge 130 is able to identify the associated destination network (e.g., VXLAN 5000) from the internal VLAN ID (e.g., VLAN 10).

(d) Packet Processing by Provider Edge 130

Figure 3:
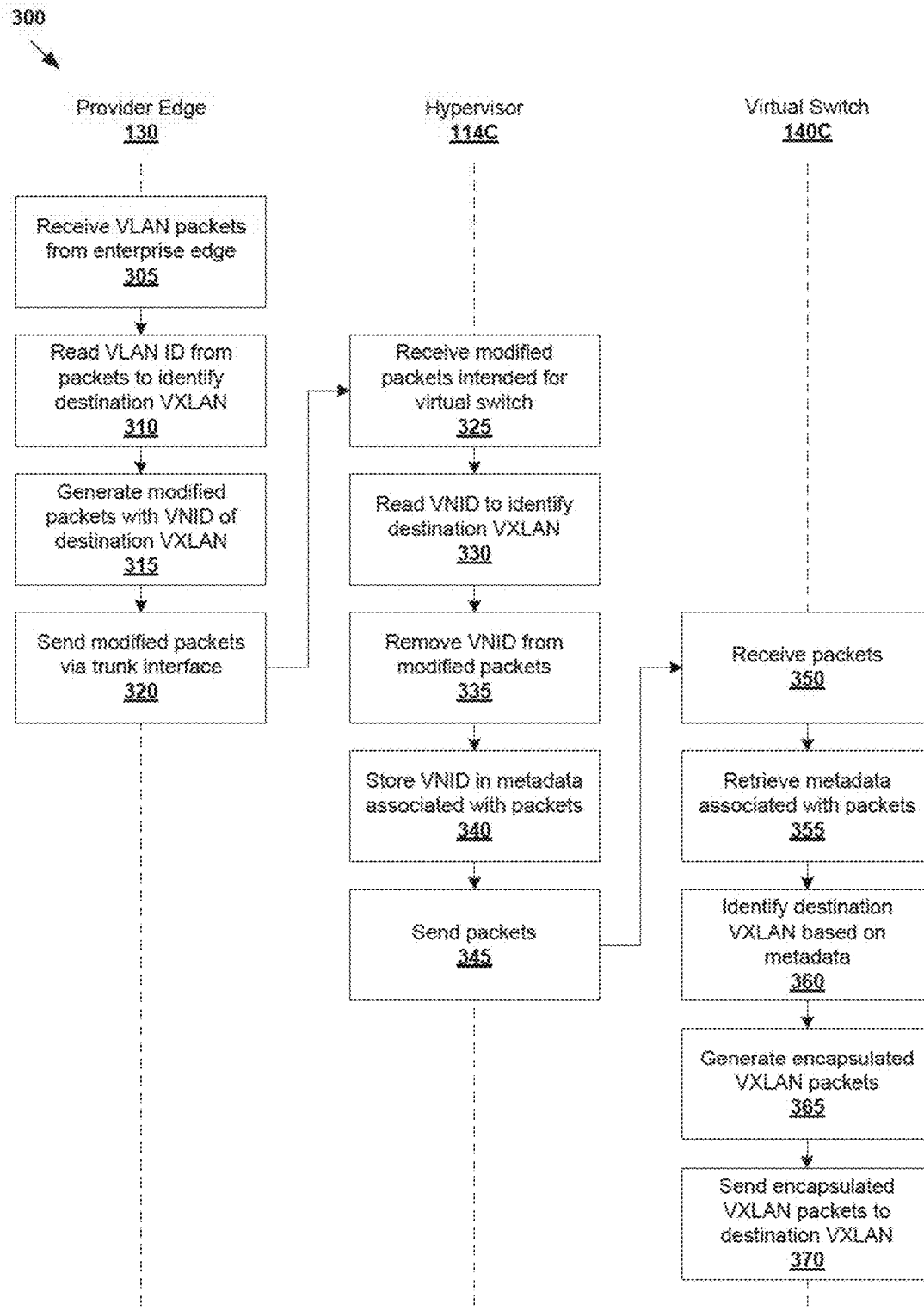
FIG. 3 is a flowchart of an example process to perform traffic forwarding to a destination network according to the first traffic forwarding scenario in FIG. 1.

FIG. 3 is a flowchart of example process 300 to perform traffic forwarding to a destination network according to the first traffic forwarding scenario in FIG. 1. In this example, the source overlay network is VXLAN 7000, and destination network is VXLAN 5000. Example process 300 may include one or more operations, functions, or actions illustrated by one or more blocks, such as blocks 305 to 370. The various blocks may be combined into fewer blocks, divided into additional blocks, and/or eliminated based upon the desired implementation. For example, although hypervisor 114C is shown to perform blocks 325 to 345 and virtual switch 140C to perform blocks 350-370, these blocks and related examples throughout the present disclosure may be performed by a single module in practice.

At 305 in FIG. 3, provider edge 130 receives VLAN packets 170 from enterprise edge 120 via tunnel 106. Next, at 310 in FIG. 3, provider edge 130 reads an internal VLAN ID (e.g., VLAN 10) from VLAN packets 170 to identify an associated destination overlay network (e.g., VXLAN 5000). At 315 in FIG. 3, provider edge 130 generates modified packets (see 180 labelled "Modified packets" in FIG. 1) by modifying VLAN packets 170 to include an overlay network identifier corresponding to the identified destination network (e.g., VNID=5000 for VXLAN 5000).

As will be discussed using FIG. 4 below, the modification at 315 may involve removing the VLAN ID from VLAN packets 170 and encapsulating them with a "pseudo header" that includes the overlay network identifier (e.g., VNID=5000). At 320 in FIG. 3, provider edge 130 communicates modified packets 180 through to virtual switch 140C via trunk interface 116C.

(e) Packet Processing by Hypervisor 114C

Hypervisor 114C may perform the following to convert modified packets 180 from provider edge 130 into a format compatible with virtual switch 140C. At 325 and 330 in FIG. 3, hypervisor 114C receives modified packets 180 and reads an overlay network identifier (e.g., VNID=5000) from modified packets 180 to identify the associated destination overlay network (e.g., VXLAN 5000).

At 335 in FIG. 3, hypervisor 114C removes the overlay network identifier (e.g., VNID=5000 for VXLAN 5000) from modified packets 180. For example, this may involve decapsulating a pseudo header that includes the overlay network identifier, thereby generating packets (see 182 labelled "Packets" in FIG. 1) that may correspond to decapsulated packets 166 at enterprise site 102.

At 340 in FIG. 3, hypervisor 114C stores the overlay network identifier (e.g., VNID=5000 for VXLAN 5000) as part of metadata associated with packets 182 in any suitable storage (e.g., kernel memory) accessible by virtual switch 140C. At 345 in FIG. 3, hypervisor 114C sends packets 182 through to virtual switch 140C.

(f) Packet Processing by Virtual Switch 140C

At 350, 355 and 360 in FIG. 3, virtual switch 140C receives packets 182 and retrieves associated metadata to identify the destination overlay network (e.g., VXLAN 5000). At 365 in FIG. 3, virtual switch 140C serves as a VTEP to generate encapsulated VXLAN packets (see 184 labelled "VXLAN packets with VNID 5000" in FIG. 1).

Here, the term "encapsulated" is used to describe overlay network encapsulation. For example, each encapsulated VXLAN packet 184 may include an outer Ethernet header with non-zero MAC addresses, an outer IP header with non-zero IP addresses, an outer UDP header and a VXLAN header carrying the VNID of the destination overlay network (i.e., VNID=5000 for VXLAN 5000). At 370 in FIG. 3, virtual switch 140C sends encapsulated VXLAN packets 184 to the destination overlay network (e.g., VXLAN 5000) via physical network 109.

Upon receiving encapsulated VXLAN packets (see 186 labelled "VXLAN packets with VNID 5000" in FIG. 1), virtual switch 140D serves as a VTEP to perform decapsulation. In the case of VXLAN decapsulation, the outer Ethernet header, outer IP header, outer UDP header and VXLAN header carrying the VNID (i.e., VNID=5000 for VXLAN 5000) are removed from each received packet 186. The resulting packets (see 188 labelled "Packets" in FIG. 1) received by destination VM6 156 correspond to packets 160 sent by source VM1 151.

Although traffic forwarding from enterprise site 102 to provider site 104 is shown in the examples in FIG. 1 to FIG. 3, hypervisor 114B/114C, virtual switch 140B/140C, enterprise edge 120 and provider edge 130 also support traffic forwarding in the reverse direction. In this case, the source overlay network is VXLAN 5000, and destination overlay network VXLAN 7000. Example process 200 may be implemented by virtual switch 140C according to blocks 205 to 220; hypervisor 114C according to blocks 225 to 245; and provider edge 130 according to blocks 250 to 265. Similarly, example process 300 may be implemented by enterprise edge 120 according to blocks 305 to 320; hypervisor 114B according to blocks 325 to 345; and virtual switch 140B according to blocks 350 to 370.

Example Packet Formats

Figure 4:
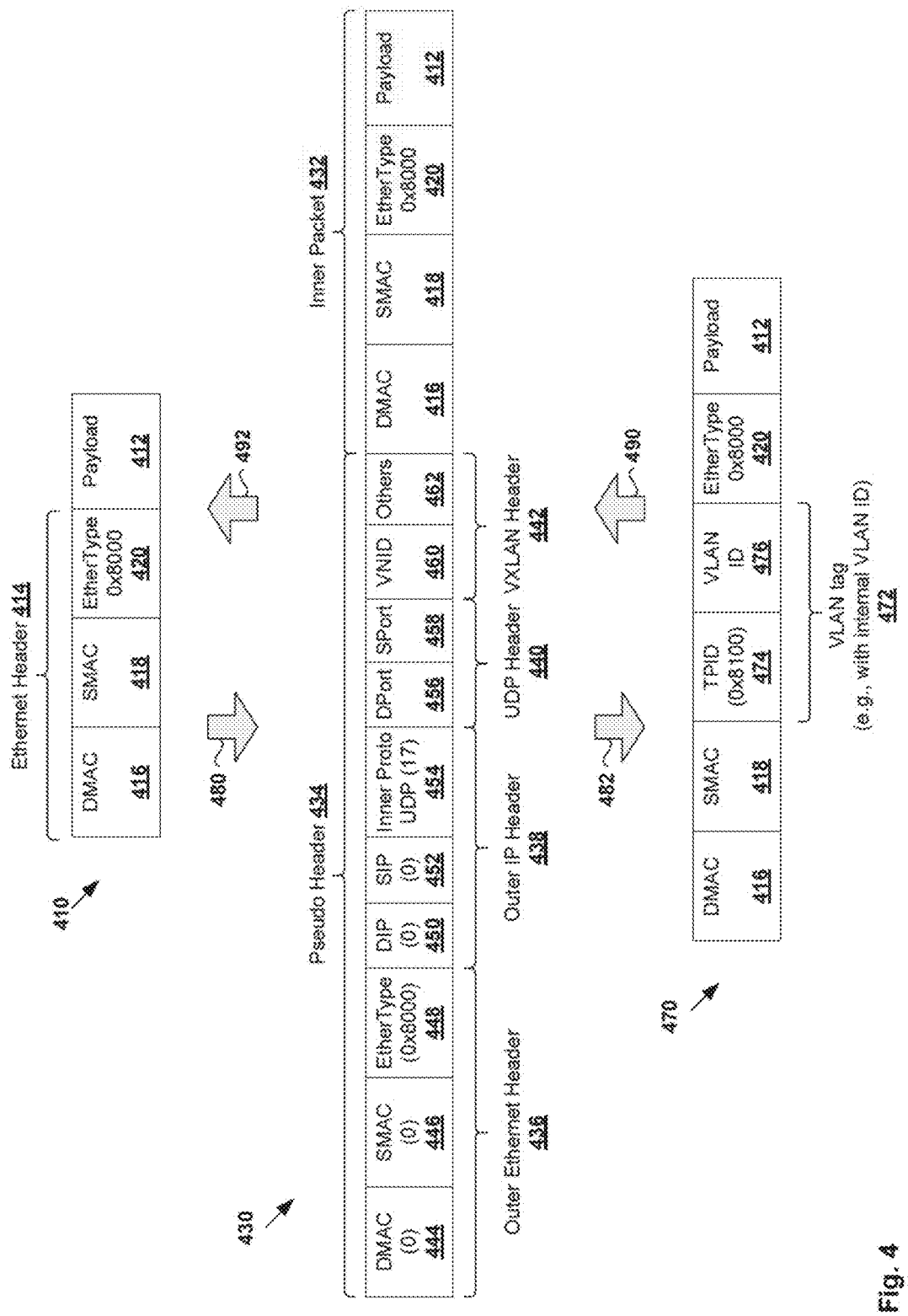
FIG. 4 is a schematic diagram illustrating example packet formats for traffic forwarding in the example network environment in FIG. 1.

FIG. 4 is a schematic diagram illustrating example packet formats used for traffic forwarding in example network environment 100 in FIG. 1. Although some examples are shown, any additional or alternative fields may be used.

First packet format 410 represents payload 412 (e.g., IP packet or any other network layer packet) encapsulated with layer-2 Ethernet header 414. Ethernet header 414 includes destination MAC address (DMAC) 416, source MAC address (SMAC) 418 and ethertype 420 to indicate the protocol used by payload 412 (e.g., 0x8000 for IP). In the example in FIG. 1, first packet format 410 may be used for "packets" shown at 160, 166, 182 and 188. In this case, destination MAC address 416 is set to the MAC address of VM6 156 and source MAC address 418 set to the MAC address of VM1 151. The MAC addresses may be obtained using any suitable approach, such as using an Address Resolution Protocol (ARP) process, etc.

Second packet format 430 represents inner packet 432 (having first packet format 410) encapsulated with pseudo header 434 that includes outer Ethernet header 436, outer IP header 438, outer UDP header 440 and VXLAN header 442. Outer Ethernet header 436 includes destination MAC address 444, source MAC address 446 and ethertype 448 (e.g., 0x8000 for IP). Outer IP header 438 includes destination IP address 450, source IP address 452 and layer-4 protocol type 454 (e.g., 17 for UDP). Outer UDP header 440 includes destination port 456 and source port 458, and VXLAN header 442 includes 24-bit VXLAN tag or VNID 460 and other fields 462 (e.g., flags, reserved fields).

In the example in FIG. 1, second packet format 430 may be used for "modified packets" shown at 168 and 180. As discussed using FIG. 2 and FIG. 3, modified packets 168 are generated by hypervisor 114B to include VNID 460 of the source overlay network (e.g., VNID=7000 for VXLAN 7000), and modified packets 180 by provider edge 130 to include VNID 460 of the destination overlay network (e.g., VNID=5000 for VXLAN 5000).

Compared to a conventional VXLAN header (not shown for simplicity), pseudo header 434 has similar fields but some are set to zero. For example, MAC addresses 444, 446 and IP addresses 450, 452 may be set to zero in "modified packets" 168, 180. Although pseudo header 434 is used as an example header to include the VNID of the source or destination overlay network, any other format may be used. Further, it is not necessary to include the VNID in a "header" but rather, where appropriate, in inner packet 434.

Third packet format 470 represents a VLAN packet with VLAN tag 472, which includes 16-bit tag protocol identifier (TPID) 474 (e.g., 0x8100 for IEEE 802.1Q) and 12-bit VLAN ID 476. Other fields 412, 416, 418 and 420 are the same as that of inner packet 432. In the example in FIG. 1, third packet format 470 may be used for VLAN packets 170, with VLAN ID at 476 having a value of '10'.

FIG. 4 also indicates modifications or conversions (see downward arrows 480, 482) from first packet format 410 to second packet format 430 and then to third packet format 470. In the example in FIG. 1, modification 480 may be performed by hypervisor 114B (see 240 in FIG. 2) to generate "modified packets" 168, and modification 482 by enterprise edge 120 (see 260 in FIG. 2) to generate VLAN packets 170. Modification 480 may involve generating pseudo header 434, and setting MAC addresses 444, 446 and IP addresses 450, 452 to zero. Modification 482 may involve removing pseudo header 434 and adding VLAN tag 472.

In order to reach the destination network, the above modifications or conversions may be reversed (see upward arrows 490, 492). For example in FIG. 2, modification 490 from third packet format 470 to second packet format 430 may be performed by provider edge 130 (see 315 in FIG. 3) to generate modified packets 180. Modification 492 from second packet format 430 to first packet format 410 may be performed by hypervisor 114C (see 335 in FIG. 3) to generate packets 182 that are sent to virtual switch 140C.

Example VXLAN-VLAN Extension

Figure 5:
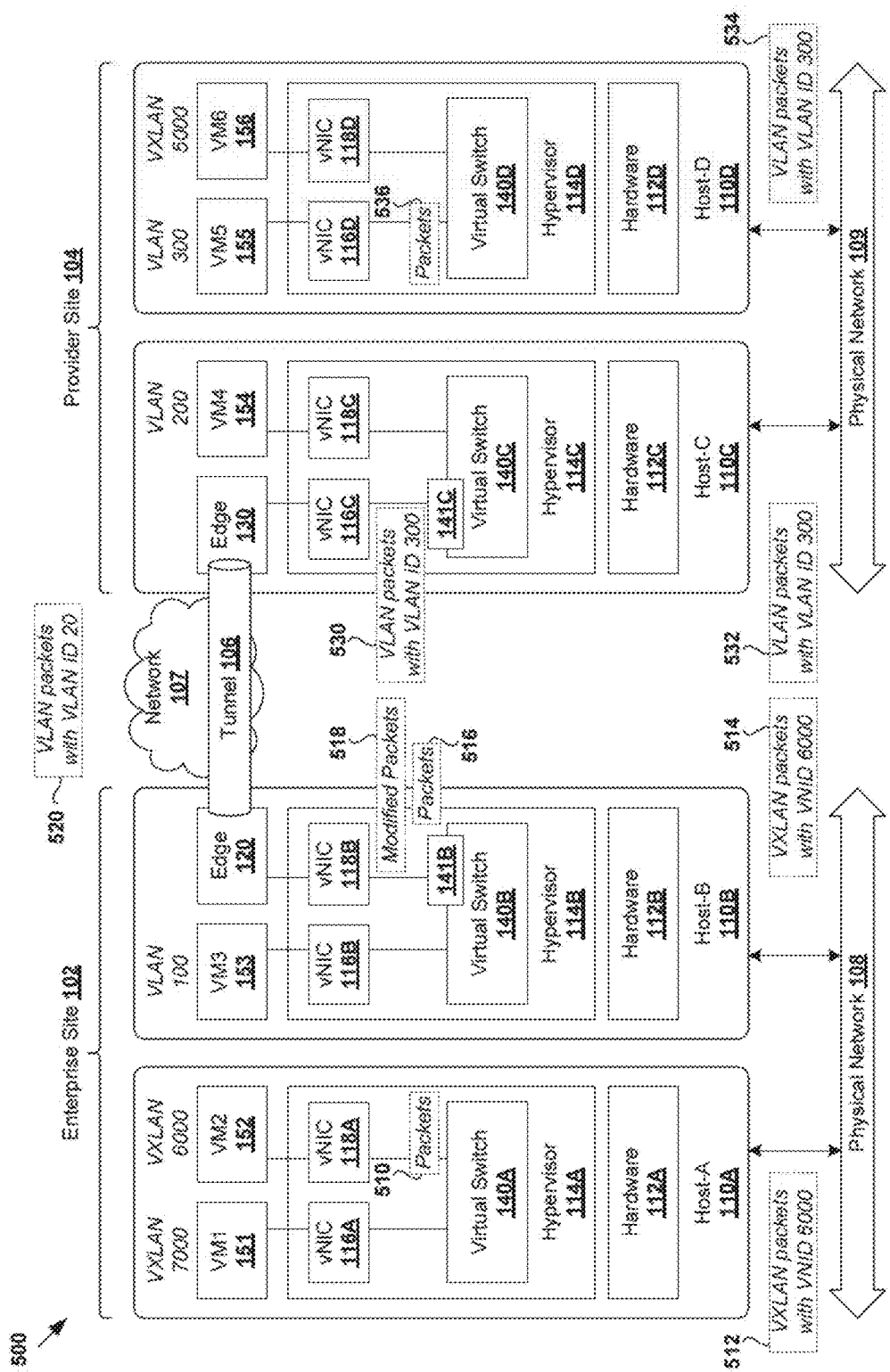
FIG. 5 is a schematic diagram illustrating the example network environment in FIG. 1 according to a second traffic forwarding scenario.

Turning now to FIG. 5, the examples discussed with reference to FIG. 2, FIG. 3 and FIG. 4 may be adapted for VXLAN-VLAN extension. In more detail, FIG. 5 is a schematic diagram illustrating example network environment 100 in FIG. 1 according to a second traffic forwarding scenario. In this case, VXLAN 6000 is an example "source overlay network" and VLAN 300 an example "destination network". Compared to the first scenario in FIG. 1, the "destination network" is a VLAN, not VXLAN. FIG. 5 will be explained with reference to the examples in FIG. 2, FIG. 4 and FIG. 6.

In the example in FIG. 5, virtual switch 140A serves as a VTEP to perform VXLAN encapsulation on packets (see 510 labelled "Packets" in FIG. 5) originating from VM2 152. The encapsulated packets (see 512 labelled "VXLAN packets with VNID 6000" in FIG. 1) each include an outer Ethernet header, an outer IP header, an outer UDP header and a VXLAN header that includes VNID=6000 identifying source VXLAN 6000. In order to reach destination VM5 155, encapsulated packets 512 are forwarded to enterprise edge 120 serving as the default gateway for VM2 152.

(a) Packet Processing by Virtual Switch 140B

At 205 in FIG. 2, virtual switch 140B on Host-B 110B receives encapsulated packets (see 514 labelled "VXLAN packets with VNID 6000" in FIG. 5) from Host-A 110A via physical network 108. At 210 in FIG. 2, virtual switch 140B, which serves as a VTEP for enterprise edge 120, modifies encapsulated packets 514 to generate decapsulated packets (see 516 labelled "Packets" in FIG. 5). Similar to FIG. 1, the term "decapsulated" is used to describe overlay network decapsulation. For example, VXLAN decapsulation involves removing the outer Ethernet header, outer IP header, outer UDP header and VXLAN header from encapsulated packets 514. Decapsulated packets 516 may have first example format 410 discussed using FIG. 4.

At 215 and 220 in FIG. 2, virtual switch 140B stores metadata associated with decapsulated packets 516 and communicates decapsulated packets 516 through to enterprise edge 120 via trunk interface 118B. In the example in FIG. 5, VNID=6000 for VXLAN 6000 may be stored as part of the metadata in any suitable storage accessible by hypervisor 114B.

(b) Packet Processing by Hypervisor 114B

Similar to the example in FIG. 1, hypervisor 114B on Host-B 110B may be configured to circumvent the decapsulation performed by virtual switch 140B by generating and communicating "modified packets" (see 518 in FIG. 5) through to trunk interface 118B.

In more detail, at 225 in FIG. 2, hypervisor 114B receives decapsulated packets 516 intended for trunk interface 118B of enterprise edge 120. At 230 and 235 in FIG. 2, hypervisor 114B retrieves metadata associated with decapsulated packets 516 to identify the source overlay network (e.g., VXLAN 6000).

At 240 in FIG. 2, hypervisor 114B generates modified packets 518 by modifying decapsulated packets 516 to include an overlay network identifier (e.g., VNID=6000) corresponding to the identified source overlay network (e.g., VXLAN 6000). Modification 480 discussed with reference to FIG. 4 may be used here to encapsulate decapsulated packets 516 with "pseudo header" 434 carrying VNID=600 (see 460 in FIG. 4). At 245 in FIG. 2, hypervisor 114B sends modified packets 518 to enterprise edge 120 via trunk interface 118B.

(c) Packet Processing by Enterprise Edge 120

At 250 and 255 in FIG. 2, enterprise edge 120 receives modified packets 518 via trunk interface 118B and reads the overlay network identifier (e.g., VNID=6000) to identify the source overlay network (e.g., VXLAN 6000).

At 260 in FIG. 2, enterprise edge 120 generates VLAN packets (see 520 labelled "VLAN packets with VLAN ID 20" in FIG. 5) by modifying each received packet 518 to include an internal VLAN ID (e.g., 20). The internal VLAN ID associates the identified source overlay network (e.g., VXLAN 6000) at enterprise site 102 with a destination network (e.g., VLAN 300) at provider site 104. Modification 482 in FIG. 4 may be used to obtain VLAN packets 520 having third example format 430.

At 265 in FIG. 2, enterprise edge 120 forwards VLAN packets 520 to provider edge 130 at provider site 104. VLAN packets 520 includes the internal VLAN ID (e.g., VLAN 20) from which provider edge 130 is able to identify the destination network (e.g., VLAN 300).

(d) Packet Processing by Provider Edge 130

Figure 6:
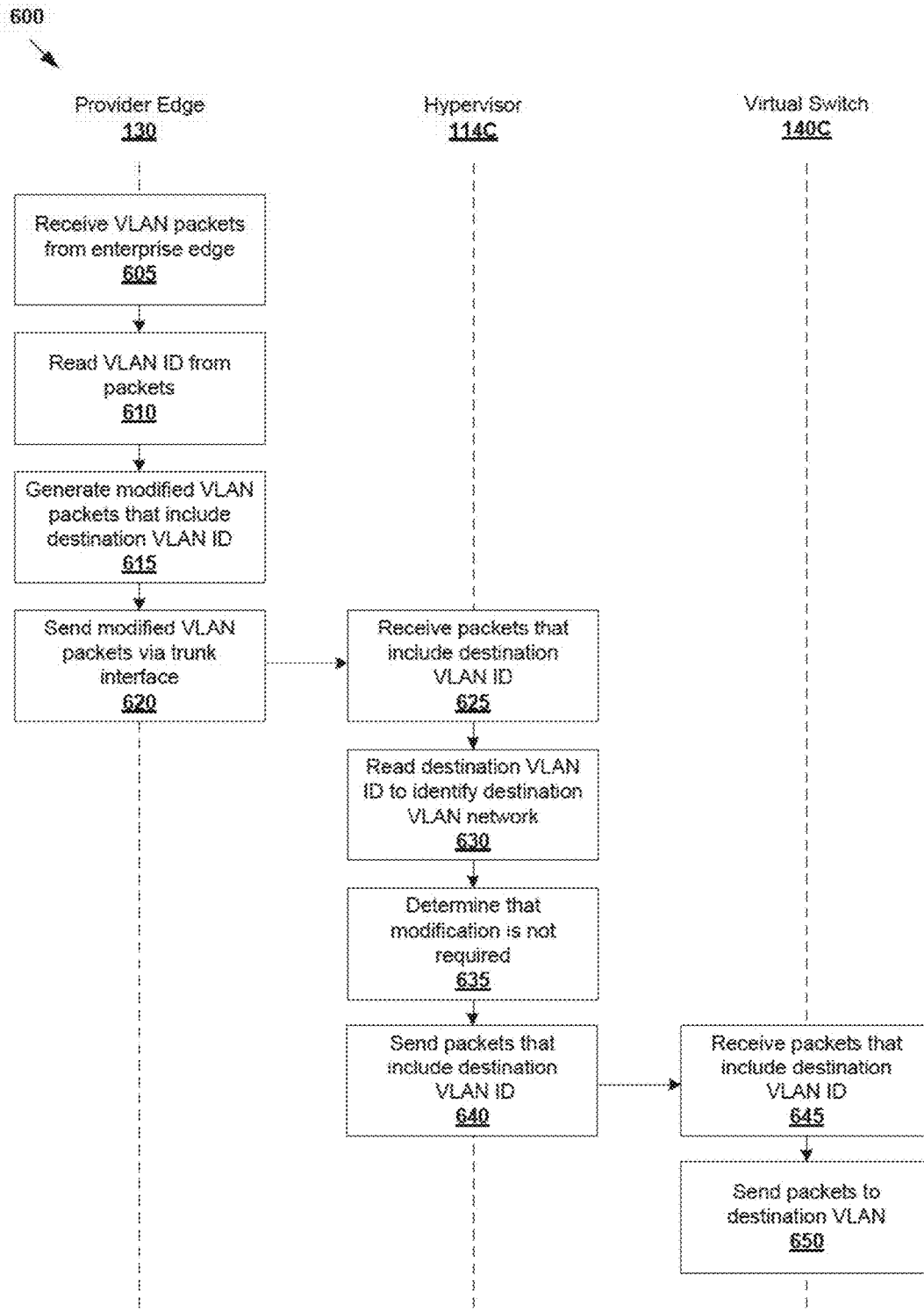
FIG. 6 is a flowchart of an example process to perform traffic forwarding to a destination network according to the second traffic forwarding scenario in FIG. 5.

FIG. 6 is a flowchart of example process 600 to perform traffic forwarding to a destination network according to the second traffic forwarding scenario in FIG. 5. Example process 600 may include one or more operations, functions, or actions illustrated by one or more blocks, such as blocks 605 to 650. The various blocks may be combined into fewer blocks, divided into additional blocks, and/or eliminated based upon the desired implementation. Similar to the examples in FIG. 2 and FIG. 3, although hypervisor 114C is shown to perform blocks 625 to 640 and virtual switch 140C to perform blocks 645-650, these blocks and related examples throughout the present disclosure may be performed by a single module in practice.

At 605 and 610 in FIG. 6, provider edge 130 receives VLAN packets 520 from enterprise edge 120 via tunnel 106 and reads an internal VLAN ID (e.g., VLAN 20) to identify an associated destination VLAN (e.g., VLAN 300). At 615 in FIG. 6, provider edge 130 generates modified packets (see 530 labelled "VLAN packets with VLAN ID 300" in FIG. 5) that each include an identifier corresponding to the identified destination VLAN (e.g., VLAN ID=300 for VLAN 300).

Using third packet format 470 in FIG. 4, the modification at 615 may include updating VLAN ID (see 476) from the internal VLAN ID (e.g., 20) to the destination VLAN ID (e.g., 300). As such, unlike the first traffic forwarding scenario in FIG. 1, it is not necessary to perform modifications 490 and 492 in FIG. 4 because the destination network is a VLAN network. At 620 in FIG. 6, provider edge 130 sends modified packets 530 via trunk interface 116C.

(e) Packet Processing by Hypervisor 114C

At 625 and 630 in FIG. 6, hypervisor 114C receives modified VLAN packets 530 intended for virtual switch 140C and identifies the destination network (e.g., VLAN 300). At 635 and 640 in FIG. 6, since the destination network (e.g., VLAN 300) is not a VXLAN segment, hypervisor 114C determines that packet modification is not required and sends modified VLAN packets 530 to virtual switch 140C.

(f) Packet Processing by Virtual Switch 140C

At 645 and 650 in FIG. 6, virtual switch 140C receives modified VLAN packets 530 and forwards them to destination VM5 155 via virtual switch 140D. See also "VLAN packets with VLAN ID 300" at 532 and 534 in FIG. 5. At virtual switch 140D, the destination VLAN ID is removed from VLAN packets 534, thereby converting them from third packet format 470 to first packet format 410 according to FIG. 4. Packets 536 received by destination VM5 155 therefore correspond to packets 510 in FIG. 5 sent by source VM2 152.

Although traffic forwarding from enterprise site 102 to provider site 104 is shown in the examples in FIG. 2, FIG. 5 and FIG. 6, hypervisor 114B/114C, virtual switch 140B/ 140C, enterprise edge 120 and provider edge 130 also support traffic forwarding in the reverse direction. In this case, the source network is VLAN 300, and destination overlay network VXLAN 6000. For example, VLAN packets with VLAN ID=300 are converted to VLAN ID=20 that associates VLAN 300 with VXLAN 6000 at provider site 104. At enterprise site 102, example process 300 may be implemented by enterprise edge 120 according to blocks 305 to 320; hypervisor 114B according to blocks 325 to 345; and virtual switch 140B according to blocks 350 to 370 to reach destination VXLAN 6000.

Example Implementation

Figure 7:
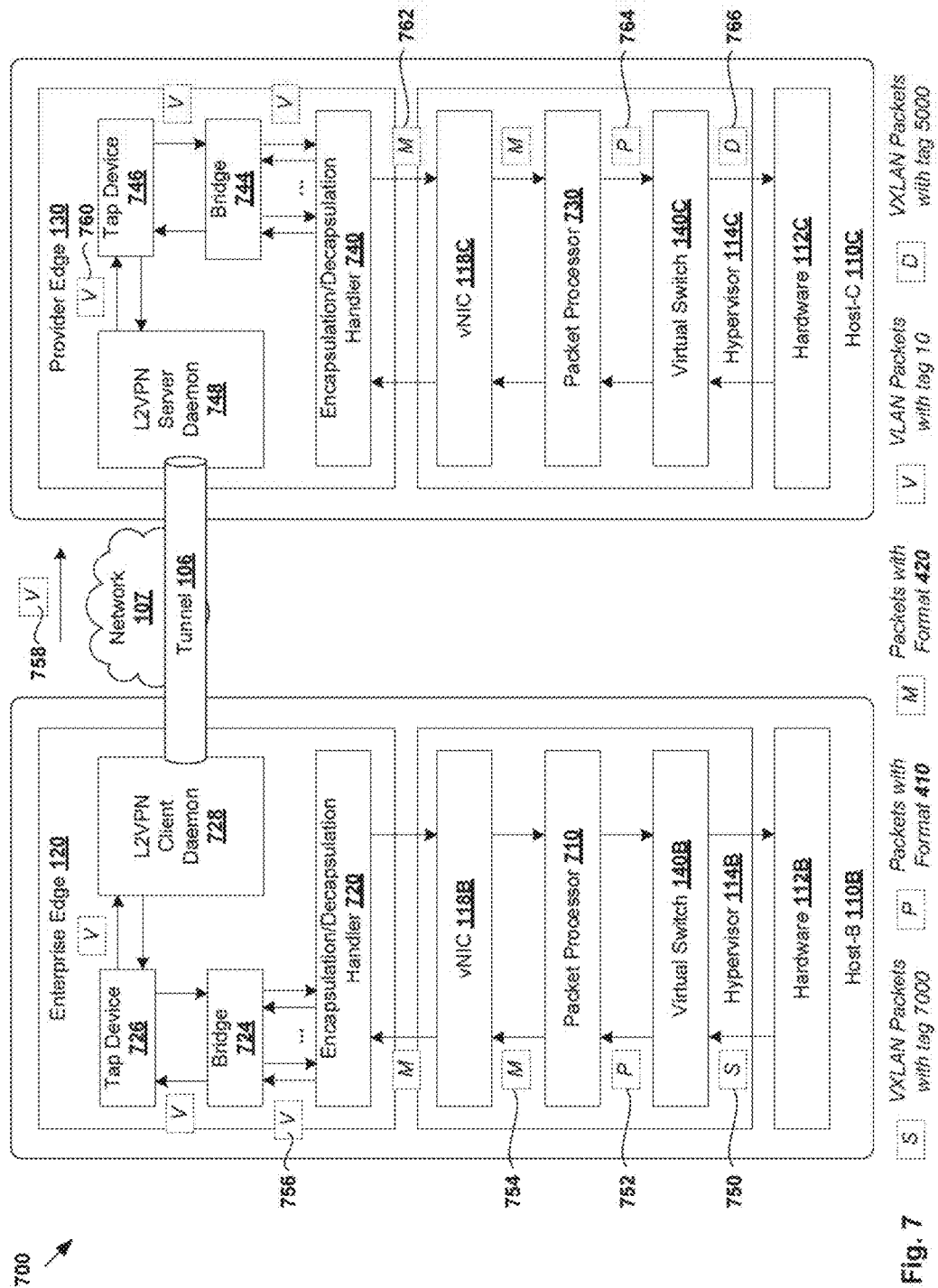
FIG. 7 is a schematic diagram illustrating example host computing devices to perform the example processes in FIG. 2, FIG. 3 and FIG. 6.

FIG. 7 is a schematic diagram illustrating example host computing devices 110B, 110C to perform the example processes in FIG. 2, FIG. 3 and FIG. 6. It should be understood that any additional or alternative components (e.g., hardware and/or software) other than that shown in FIG. 7 may be implemented, depending on the desired implementation. According to a layer-2 virtual private network (L2VPN) implementation, enterprise edge 120 may serve as an L2VPN client, and provider edge 130 as an L2VPN server. FIG. 7 will be explained using the first traffic forwarding scenario in FIG. 1. For simplicity, Host-A 110A and Host-D 110D are not shown.

In the example in FIG. 7, hypervisor 114B implements packet processor 710 to process packets according to blocks 225 to 245 in FIG. 2, and enterprise edge 120 implements encapsulation and decapsulation handler 720 to process packets according to blocks 250 to 265 in FIG. 2. Similarly, hypervisor 114C implements packet processor 730 to process packets according to blocks 325 to 345 in FIG. 3 (VXLAN-VXLAN extension) and 625 to 640 in FIG. 6 (VXLAN-VLAN extension). Provider edge 130 implements encapsulation and decapsulation handler 740 to process packets according to blocks 305 to 320 in FIGS. 3 and 605 to 620 in FIG. 6.

According to the first traffic forwarding scenario in FIG. 1, virtual switch 140B decapsulates VXLAN packets 750 (labelled "S") from source VXLAN 7000 to generate decapsulated packets 752 (labelled "P") having first packet format 410 in FIG. 4. Packet processor 710 is to receive and modify decapsulated packets 752 to generate modified packets 754 (labelled "M") having second packet format 430. Encapsulation and decapsulation handler 720 is to receive and modify modified packets 754 to VLAN packets 756 (labelled "V") having third packet format 430 before VLAN packets 756 are processed by an upper level network stack (e.g., IP stack). VLAN packets 756 are then delivered to bridge 724 and tap device 726 L2VPN client daemon 728 (e.g., SSL daemon) polls packets from tap device 726 for forwarding over tunnel 106. When tunnel 106 is an SSL tunnel, VLAN packets 758 may be encrypted and include SSL records.

At provider edge 130, L2VPN server daemon 748 (e.g., SSL daemon) receives VLAN packets 758 and performs any necessary decryption. Referring to 760, the VLAN packets are then pushed through to tap device 746, which then sends them to bridge 744. Encapsulation and decapsulation handler 740 is to receive VLAN packets 760 from bridge 744.

Encapsulation and decapsulation handler 740 then converts VLAN packets 760 (labelled "V") having third packet format 430 to modified packets 762 (labelled "M") having second packet format 430, such as by removing the internal VLAN tag (see 472 in FIG. 4) and adding a pseudo header (see 434 in FIG. 4). Packet processor 730 receives and converts modified packets 762 to packets 764 (labelled "P") having first packet format 410. Since packets 764 are intended for VXLAN 5000, virtual switch 140C performs VXLAN encapsulation to convert them into VXLAN packets 766 (labelled "D") with destination VNID=5000 identifying VXLAN 5000. VXLAN packets 766 are then forwarded to VXLAN 5000.

In practice, encapsulation and decapsulation handlers 720, 740 may be implemented as part of a device framework (e.g., Linux device framework), such as in the form of a patch, pluggable kernel module, etc. In the example in FIG. 7, encapsulation and decapsulation handlers 720, 740 are designed to be efficient (e.g., linear speed), lightweight and uniform (e.g., egress and ingress are processed at the same point within the device framework). Although traffic forwarding according to the example in FIG. 1 is shown in FIG. 7, packet processors 710, 730 and encapsulation and decapsulation handlers 720, 740 may be used for traffic forwarding in the reverse direction, and between any pair of layer-2 segments having the same or different VLAN or VXLAN IDs.

Figure 8:
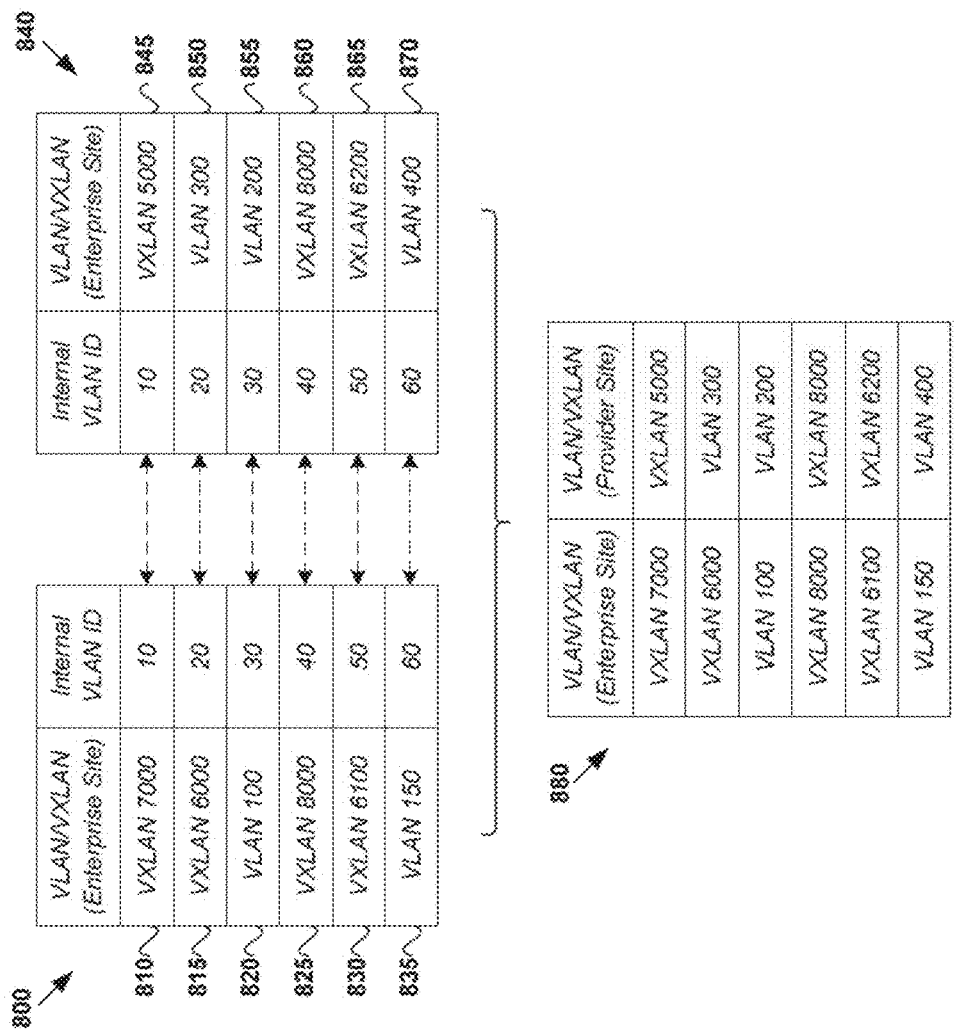
FIG. 8, which illustrates example mapping tables to facilitate traffic forwarding according to the example scenarios in FIG. 1 and FIG. 5.

Further examples are shown in FIG. 8, which illustrates example mapping tables 800, 840 to facilitate traffic forwarding according to the example scenarios in FIG. 1 and FIG. 5. In this example, multiple VXLAN-VXLAN, VXLAN-VLAN and VLAN-VLAN extensions are supported. In particular, enterprise edge 120 and provider edge 130 support multiple VXLAN-VXLAN extensions, such as between VXLAN 7000 and VXLAN 5000 (see 810 and 845), VXLAN 8000 and VXLAN 8000 (see 825 and 860), and VXLAN 6100 to VXLAN 6200 (see 830 and 865). Other extensions include VXLAN 6000 to VLAN 300 (see 815 and 850), VLAN 100 to VLAN 200 (see 820 and 855) and VLAN 150 to VLAN 400 (see 835 and 870). A summary of the example extensions is listed in table 880.

Any suitable approach may be used to update mapping tables 800, 840, such as via an Input Output Control (IOCTL) interface provided by Linux kernel. Mapping table 800/840 may be in any suitable format and stored in any suitable storage (e.g., kernel memory) accessible by encapsulation and decapsulation handler 720/740. In one example, an array storage table may be used to store entries that map a VLAN ID to an internal VLAN ID. The array storage table has a maximum size of 4094 and a lookup speed of O(1). Since there are over 16 million VNIDs, a hash storage table may be used to store entries that map a VNID to an internal VLAN ID. In this case, the lookup speed is between O(1) and O(n), with an average of O(n/1024) (e.g., if the VNID is not random enough). For entries that map an internal VLAN ID to a VLAN ID or VNID, an array storage table may also be used, with a size of 4094 (i.e., at most 4094 internal VLAN IDs) and lookup speed of O(1).

The modification from second packet format 430 carrying VNID 460 to third packet format 470 carrying VLAN ID 476 may be performed with linear speed. For example, pseudo header 434 may be removed and internal VLAN tag 472 inserted without requiring any buffer copy. However, the reverse modification from third packet format 470 to second packet format 430 may require buffer copy. For example, if there is not enough buffer room to add pseudo header 432, a new buffer may be created and data copy to the new buffer required. The update of VLAN ID 476 in third packet format 470 may be performed with linear speed.

The example processes explained using FIG. 2, FIG. 3 and FIG. 6 may include additional processing relating to Transport Control Protocol (TCP) Segmentation Offload (TSO) and TCP Checksum Offload (TCO). If TSO is enabled, larger chunks of data are divided into TCO segments. The TCP header includes a 16-bit checksum field in the TCOP header is used to verify the integrity of the header and data. If a virtual machine is communicating with a virtual machine on the same host and virtual switch, checksum computation is performed by the virtual NIC of the receiving virtual machine.

In network environment 100, packet processor 710 may check whether TSO and/or TSO are enabled for packets received from VM3 153. If TSO is enabled, packet processor 710 segments each packet into TCP segments where appropriate, and adds a pseudo header (see 434 in FIG. 4) to each segment. If CSO is enabled, checksum computation is performed. For packets received from VM1 151 and VM2 152, the additional processing relating to TSO and/or CSO is generally not required. Similar processing may be performed by provider edge 130 when processing packets to and from VM4 154 supported by the same Host-C 1100C. Additional processing relating to packet fragmentation and assembly may be performed where appropriate.

Trunk interface 118B/116C may be configured using any suitable approach, such as via a management entity (not shown for simplicity) in communication with Host-B 110B and Host-C 110C. For example, a user (e.g., network administrator) operating a computing device may access the management entity to configure a list of VNIDs and VLAN IDs for trunk interface 118B/116C. In the examples in FIG. 8, the list for trunk interface 118B includes VXLAN 7000, VXLAN 6000, VLAN 100, VXLAN 8000, VXLAN 6100 and VLAN 150. The list for trunk interface 116C includes VXLAN 5000, VLAN 300, VLAN 200, VXLAN 8000, VXLAN 6200 and VLAN 400.

The management entity then sends configuration data to virtual switch 140B/140C and edge 120/130 to configure trunk interface 118B/116C, such as via an opaque channel with host 110B/110C. The configuration data includes any suitable data, such as the list of VNIDs and VLAN IDs to trunk, multicast group for each VNID, etc. The management entity, which may be implemented using one or more virtual or physical entities, provides other management functionalities, such as to manage hosts 110A-110D, enterprise edge 120, provider edge 130, virtual machines 151-156, etc.

In practice, trunk interface 118B operates in promiscuous mode to receive packets from and send packets to VXLAN 7000, VXLAN 6000, VXLAN 8000 and VXLAN 6100, and from VLAN 100 and VLAN 150. Similarly, trunk interface 116C operates in promiscuous mode to receive packets from and send packets to VXLAN 5000, VXLAN 8000 and VXLAN 6200, and VLAN 300, VLAN 200 and VLAN 400.

Conventionally, one vNIC is usually configured to receive packets from or sends packets to one logical network. Although multiple vNICs may be configured, they consume more resources and add overheads at the host. Also, a virtual machine may have a limited number of vNICs (e.g., 10), which limits the number of logical networks to which the virtual machine connect. By configuring trunk interface 118B/116C, it is not necessary to support multiple vNICs that connect to different logical networks. The use of trunk interface 118B/116C supports more logical networks and network extensions, which is desired for large data centres.

It should be understood that the mapping from a VNID or VLAN ID to an internal VLAN ID is not configured for trunk interface 118B/116C, but rather for encapsulation and decapsulation handler 720/740 of edge 120/130 in the examples discussed. This means the conversion of a VNID or VLAN ID to an internal VLAN ID (and vice versa) is performed by edge 120/130. By doing so, packets from more than 4094 layer-2 segments may be received and sent by edge 120/130 via trunk interface 118B/116C. This may be useful for other applications of packet processor 710/730 and trunk interface 118B/116C.

For example, in a network security application, a "network element" such as security virtual machine may be configured with a trunk interface to trunk a list of VNIDs and VLAN IDs to be trunked. Similarly, a packet processor may be implemented by a hypervisor supporting the security virtual machine to perform the processing explained with reference to FIG. 2, FIG. 3 and FIG. 6. This allows the security virtual machine to monitor network traffic to and from the layer-2 segments specified in the list. In practice, the abovementioned "network element" may be any suitable virtual or physical entity. As such, blocks 225 to 245 in FIG. 2, blocks 325 to 345 in FIG. 3 and blocks 625 to 640 in FIG. 6 may be performed independently, and not limited to the example applications discussed here.

Distributed Virtual Switch (DVS)

Although the examples in FIG. 1 to FIG. 8 are explained with reference to virtual switch 140A/140B/140C/140D, it will be appreciated that a distributed virtual switch (DVS) may also be used. The DVS represents a collection of individual virtual switches across different hosts. In practice, the DVS may be implemented using any suitable technology, such as vSphere Distributed Switch (developed by VMware, Inc.), etc.

In more detail, FIG. 9 is a schematic diagram of another example network environment 100 in FIG. 1 to provide layer-2 connectivity. Although an example is shown, it should be understood that environment 900 and DVS 910/920 may include additional or alternative components, and each component may have a different configuration, depending on the desired implementation. At enterprise site 102, DVS 910 (see dotted line box) spans across hosts 110A-110B and binds individual virtual switches 140A-140B into an aggregate switch. At provider site, DVS 920 (also dotted line box) spans across hosts 110C-110D and binds individual virtual switches 140C-140D into an aggregate switch.

Compared to having to manage individual and segregated virtual switches 140A-140D, DVS 910 and 920 are logically configurable to simplify the provisioning and administration of logical networks (e.g., VXLAN, VLAN) connecting virtual machines 151-156. DVS 910 and 920, each being a software abstraction, may be implemented using any suitable number of components distributed in different hardware, such as using hypervisors 114A-114B and 114C-114D respectively. Although DVS 910 and 920 are shown for simplicity, any number of DVSs may be configured.

The above examples can be implemented by hardware (including hardware logic circuitry), software or firmware or a combination thereof. For example, hosts 110A-110D may be implemented by any suitable network device or computer system, which may include processor and memory that may communicate with each other via a bus, etc. The network device may include a non-transitory computer-readable medium having stored thereon instructions that, when executed by the processor, cause the processor to perform processes described herein with reference to FIG. 1 to FIG. 9.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to perform traffic forwarding between geographically dispersed first site and second site, the method comprising:

receiving, by a first edge device at the first site, network traffic comprising a plurality of packets via a trunk interface of the first edge device from a virtual tunnel endpoint, the virtual tunnel endpoint having decapsulated the packets prior to communicating the packets through the trunk interface, wherein the trunk interface is configured to receive traffic originating from multiple overlay networks in communication with the first edge device at the first site;

reading, by the first edge device, an overlay network identifier from each of the packets to identify a source overlay network of the received network traffic from the multiple overlay networks;

modifying, by the first edge device, each of the packets to include a virtual local area network (VLAN) identifier that associates the identified source overlay network with a destination network at the second site and remove the overlay network identifier, thereby generating modified network traffic; and forwarding, by the first edge device, the modified network traffic to a second edge device at the second site to identify the destination network based on the VLAN identifier.

2. The method of claim 1, wherein modifying each of the packets to remove the overlay network identifier comprises:
decapsulating a pseudo header that includes the overlay network identifier from each of the packets, wherein a source layer-2 address, a destination layer-2 address, a source layer-3 address and a destination layer-3 address in the pseudo header are set to zero.

3. The method of claim 1, wherein the overlay network identifier is included in each of the packets after the packets are decapsulated by the virtual tunnel endpoint and before the packets are communicated through the trunk interface.

4. The method of claim 1, wherein the destination network is one of multiple overlay networks in communication with the second edge device at the second site.

5. The method of claim 4, wherein modifying each of the packets further comprises:
based on the overlay network identifier of the identified source overlay network, retrieving the VLAN identifier from a mapping table storing multiple VLAN identifiers that associate the multiple overlay networks at the first site with the multiple overlay networks at the second site.

6. The method of claim 1, further comprising:
receiving ingress network traffic comprising a plurality of packets from the second edge device;
reading a VLAN identifier from each of the packets to identify a destination overlay network of the received ingress network traffic from the multiple overlay networks at the first site;
modifying each of the packets to include an overlay network identifier corresponding to the identified destination overlay network, thereby generating modified ingress network traffic; and
forwarding the modified ingress network traffic to the virtual tunnel endpoint via the trunk interface to reach the destination overlay network based on the overlay network identifier.

7. The method of claim 6, wherein generating the modified ingress network traffic comprises:
generating a pseudo header that includes the overlay network identifier corresponding to the identified destination overlay network;
setting a source layer-2 address, a destination layer-2 address, a source layer-3 address and a destination layer-3 address in the pseudo header to zero; and
encapsulating each of the ingress packets with the pseudo header.

8. A non-transitory computer-readable storage medium that includes a set of instructions which, in response to execution by a processor of a computing device, cause the processor to perform a method of traffic forwarding between geographically dispersed first site and second site, the method comprising:
receiving, by a first edge device at the first site, network traffic comprising a plurality of packets via a trunk interface of the first edge device from a virtual tunnel endpoint, the virtual tunnel endpoint having decapsulated the packets prior to communicating the packets through the trunk interface, wherein the trunk interface is configured to receive traffic originating from multiple overlay networks in communication with the first edge device at the first site;
reading, by the first edge device, an overlay network identifier from each of the packets to identify a source overlay network of the received network traffic from the multiple overlay networks;
modifying, by the first edge device, each of the packets to include a virtual local area network (VLAN) identifier that associates the identified source overlay network with a destination network at the second site and remove the overlay network identifier, thereby generating modified network traffic; and
forwarding, by the first edge device, the modified network traffic to a second edge device at the second site to identify the destination network based on the VLAN identifier.

9. The non-transitory computer-readable storage medium of claim 8, wherein modifying each of the packets to remove the overlay network identifier comprises:
decapsulating a pseudo header that includes the overlay network identifier from each of the packets, wherein a source layer-2 address, a destination layer-2 address, a source layer-3 address and a destination layer-3 address in the pseudo header are set to zero.

10. The non-transitory computer-readable storage medium of claim 8, wherein the overlay network identifier is included in each of the packets after the packets are decapsulated by the virtual tunnel endpoint and before the packets are communicated through the trunk interface.

11. The non-transitory computer-readable storage medium of claim 8, wherein the destination network is one of multiple overlay networks in communication with the second edge device at the second site.

12. The non-transitory computer-readable storage medium of claim 11, wherein modifying each of the packets further comprises:
based on the overlay network identifier of the identified source overlay network, retrieving the VLAN identifier from a mapping table storing multiple VLAN identifiers that associate the multiple overlay networks at the first site with the multiple overlay networks at the second site.

13. The non-transitory computer-readable storage medium of claim 8, further comprising:
receiving ingress network traffic comprising a plurality of packets from the second edge device;
reading a VLAN identifier from each of the packets to identify a destination overlay network of the received ingress network traffic from the multiple overlay networks at the first site;
modifying each of the packets to include an overlay network identifier corresponding to the identified destination overlay network, thereby generating modified ingress network traffic; and
forwarding the modified ingress network traffic to the virtual tunnel endpoint via the trunk interface to reach the destination overlay network based on the overlay network identifier.

14. The non-transitory computer-readable storage medium of claim 13, wherein generating the modified ingress network traffic comprises:
generating a pseudo header that includes the overlay network identifier corresponding to the identified destination overlay network;

setting a source layer-2 address, a destination layer-2 address, a source layer-3 address and a destination layer-3 address in the pseudo header to zero; and
encapsulating each of the ingress packets with the pseudo header.

15. A computing device configured to perform traffic forwarding between geographically dispersed first site and second site, the computing device being a first edge device at the first site and comprising:
a processor; and
a non-transitory computer-readable medium having stored thereon instructions that, when executed by the processor, cause the processor to:
receive network traffic comprising a plurality of packets via the trunk interface from a virtual tunnel, the virtual tunnel endpoint having decapsulated the packets prior to communicating the packets through the trunk interface, wherein the trunk interface is configured to receive traffic originating from multiple overlay networks in communication with the first edge device at the first site;
read an overlay network identifier from each of the packets to identify a source overlay network of the received network traffic from the multiple overlay networks;
modify each of the packets to include a virtual local area network (VLAN) identifier that associates the identified source overlay network with a destination network at the second site and remove the overlay network identifier, thereby generating modified network traffic; and
forward the modified network traffic to a second edge device at the second site to identify the destination network based on the VLAN identifier.

* * * * *